(12) United States Patent
Kleiner

(10) Patent No.: US 7,134,813 B2
(45) Date of Patent: Nov. 14, 2006

(54) COOLING CHANNEL GEOMETRY

(75) Inventor: Gilbert Kleiner, Inzighofen (DE)

(73) Assignee: Joerg Guehring, Albstadt (DE)

( * ) Notice: Subject to any disclaimer, the term of this patent is extended or adjusted under 35 U.S.C. 154(b) by 0 days.

(21) Appl. No.: 11/154,142

(22) Filed: Jun. 16, 2005

(65) Prior Publication Data
US 2005/0244235 A1    Nov. 3, 2005

Related U.S. Application Data

(63) Continuation of application No. PCT/DE2003/004276, filed on Dec. 18, 2003.

(30) Foreign Application Priority Data

| Dec. 19, 2002 | (DE) | ............................ 202 19 761 U |
| Dec. 20, 2002 | (DE) | ............................ 202 19 824 U |

(51) Int. Cl.
*B23B 51/06* (2006.01)

(52) U.S. Cl. .......................................... 408/59; 407/11

(58) Field of Classification Search .................. 408/57, 408/59, 227, 230, 229; 407/11; *B23B 51/06*; *B23C 5/28*
See application file for complete search history.

(56) References Cited

U.S. PATENT DOCUMENTS

| 2,422,994 | A |   | 6/1947 | Taylor |  |
| 3,085,453 | A | * | 4/1963 | Mossberg | .................... 76/108.1 |
| 3,313,186 | A | * | 4/1967 | Rochon | ........................ 76/108.1 |
| 3,555,935 | A | * | 1/1971 | Dorrenberg | ................ 76/108.6 |
| 4,813,823 | A | * | 3/1989 | Bieneck | ......................... 408/59 |
| 4,826,364 | A | * | 5/1989 | Grunsky | ........................ 408/59 |
| 2003/0002935 | A1 | * | 1/2003 | Camozzi | ........................ 408/57 |

FOREIGN PATENT DOCUMENTS

| DE | 36 29 035 |   |   | 3/1988 |
| JP | 62136306 | A | * | 6/1987 |
| JP | 63-216611 |   |   | 9/1988 |
| JP | 2001334409 | A | * | 12/2001 |
| JP | 2002052410 | A | * | 2/2002 |
| JP | 2004154883 | A | * | 6/2004 |
| JP | 2005001082 | A | * | 1/2005 |
| JP | 2005052940 | A | * | 3/2005 |

OTHER PUBLICATIONS

Kennametal Hertel UK: "Master Catalogue 2001", 2001, Kennametal Hertel UK, England, XP002285111, Bohrer B211 auf, p. 4, p. 33.

* cited by examiner

*Primary Examiner*—Daniel W. Howell
(74) *Attorney, Agent, or Firm*—Burr & Brown

(57) ABSTRACT

A drilling tool comprising at least one machined groove and at least one web which extend from a tip of the tool to the shank of the tool. A main cutting edge and an inner cooling channel are formed on each web. Said cooling channel extends from the tip to an opposite drill end and has a continuously extending cross-sectional contour enclosing an imaginary circle with a center point. The cross-sectional contour preferably comprises two maximum curvature values whose distance to the drill axis is greater in the direction of a line between the center point and the drill axis or equal to the distance of the center point to the drill axis. Preferably, minimum wall thicknesses exist between the inner cooling channel and (1) the outer periphery of the drill, (2) the machined surface and (3) the non-machined surface, between a minimum and a maximum.

11 Claims, 14 Drawing Sheets

COOLING CHANNEL GEOMETRY

CROSS-REFERENCE TO RELATED APPLICATIONS

This application claims the benefit of German Patent Application No. 202 19 761.1, filed Dec. 19, 2002, the entirety of which is incorporated herein by reference.

This application claims the benefit of German Patent Application No. 202 19 824.3, filed Dec. 20, 2002, the entirety of which is incorporated herein by reference.

This application is a continuation of International Application PCT/DE2003/004276, filed Dec. 18, 2003, the entirety of which is incorporated herein by reference.

FIELD OF THE INVENTION

The invention relates to a rotary driven cutting tool or insert tool, in particular a drill.

BACKGROUND OF THE INVENTION

For the purpose of supplying coolant or lubricant, cutting tools comprise internal cooling channels through which the coolant is channelled to the drill tip. Apart from the function of cooling and lubricating the drill tip, the coolant also has the function of improving chip removal.

In order to remove the chips from the cutting groove, the coolant has to be fed in at times at high pressure, especially in the case of deep-hole drilling, wherein the internal cooling channel i.e. the drill has to be able to withstand corresponding pressures without being destroyed. In particular as part of minimum quantity lubrication, a process which is becoming widespread, there is a desire to design the cooling channels so as to provide the largest volume possible. In addition, there is a need to be able to make ever smaller and longer drill holes. However, with increased lengths and reduced diameters of a drilling tool, it becomes increasingly difficult to dimension the internal cooling channels in such a way that corresponding coolant throughput or coolant pressure is provided, without the sturdiness of the drill being negatively affected. For, the size of the cooling channels is limited by the distance to the drill back or the cutting space. If the lands are too thin, cracks and tool breakages occur. In the case of multiple-cutting tools, the cooling channels must also be spaced apart from each other by a certain minimum distance, otherwise impediments result in the face geometry of the drill, i.e., for example in the transverse cutter or in a point shape.

Known drills usually have internal cooling channels with circular sections. Apart from this, in principle, methods are already known with which sintered blanks with elliptical cooling channel cross sections can be produced, for example from DE 42 42 336 A1. U.S. patent specification U.S. Pat. No. 2,422,994 already mentions a cooling channel profile design other than a circular design. Furthermore, cooling channels with a trigon profile in the form of a isosceles triangle with rounded corners have been proposed, for example in patent specification DE 199 42 966 A1.

Apart from this, in DE 3629035 A1, a double cutting drill with a cooling channel profile in the form of an isosceles triangle with rounded corners has been proposed, with which a position of the internal cooling channels close to the center is to be possible, which position makes it possible to provide central delivery from the cooling channel at the conical end of the drill.

BRIEF SUMMARY OF THE INVENTION

In contrast to the above, it is the object of the invention to improve an internally-cooled cutting tool of the generic type in relation to coolant throughput, as well as to resistance to breakage, pressure, torsion and flexing.

This object is met by the present invention.

The invention is based on the recognition that the stress occurring at the cooling channel depends on the shape of the cooling channel and thus predominantly on the stress concentration of the cooling channel at its smallest radii of curvature in the direction of the load. Furthermore, it was found that as far as the resistance is concerned with which a cutting tool, for example a drill or milling cutter, can encounter such stress peaks, i.e. in relation to its sturdiness and finally in determining whether crack formation in, or premature failure of, the tool occurs, apart from the stress peaks occurring at the cooling channel, it is the distance between the cooling channels and the cutting space and thus the position of the cooling channel on the land that are decisive.

FEM (finite-element-method) simulations have shown that while the stress peaks that occur in hitherto-used circular cooling channel geometries are low, the existing space in the land cannot be used optimally so that due to the essentially circular-segment-shaped lands, relatively small-area cooling channel cross sections occur. Due to the resulting low throughput quantities, limits concerning the length and diameter of the drill are encountered.

On the other hand, while in the case of known trigon profiles higher throughput quantities are achieved, the attempt to use trigonal cooling channel cross sections to make maximum use of the design space on the drill land, which space is in the shape of a segment of a circle, while maintaining a minimum wall thickness, and thus to increase the throughput rates, leads to extreme stress peaks in the groove root of the cooling channel and thus to reduced strength of the insert tool.

Extensive trials and simulations have resulted in the cross-sectional geometry according to the invention. This cross-sectional geometry according to the invention includes the internal cooling channel having a minimum radius of curvature in the range of from 0.35 times to 0.9 times (in particular, from 0.5 times to 0.85 times, preferably from 0.6 times to 0.85 times, particularly preferably from 0.7 times to 0.8 times, for example 0.75 times) the radius of a circle enclosed by the contour of the cooling channel. In addition, the cross-sectional geometry according to the invention includes (1) a minimum wall thickness between the internal cooling channel and the external circumference of the drill, (2) a minimum wall thickness between the internal cooling channel and the cutting face, and (3) a minimum wall thickness between the internal cooling channel and the cutting flank each being between a lower limit and an upper limit. The lower limit is $0.08 \times D$ for $D<=1$ mm, and 0.08 mm for $D>1$ mm (in particular $0.08 \times D$ for $D<=2.5$ mm and 0.2 mm for $D>2.5$ mm, preferably $0.08 \times D$ for $D<=3.75$ mm and 0.3 mm for $D>3.75$ mm, for example $0.1 \times D$ for $D<=3$ mm and 0.3 mm for $D>3$ mm), and the upper limit is $0.35 \times D$ for $D<=6$ mm, and $0.4 \times D-0.30$ mm for $D>6$ mm (in particular $0.333 \times D$ for $D<=6$ mm and $0.4 \times D-0.40$ mm for $D>6$ mm, preferably $0.316 \times D$ for $D<=6$ mm and $0.4 \times D-0.50$ mm for $D>6$ mm, particularly preferably $0.3 \times D$ for $D<=6$ mm and $0.4 \times D-0.60$ mm for $D>6$ mm, for example $0.2 \times D$ or $0.15 \times D$ for $D<=4$ mm and 0.6 mm for $D>4$ mm).

With the experimentally determined cooling channel geometry and position of the cooling channel on the land, results can be achieved whose extent in particular is surprisingly positive.

It has been shown that in a tool with a cooling channel profile according to the invention, when compared to a trigon form and equal or higher throughput quantities under load, dramatically lower local stress loads occur. The correspondingly higher mechanical strength properties of the insert tool according to the invention were confirmed in breakage tests. Tests were carried out in tools made from a commonly used hard metal with values of 0.5 times to 0.85 times the radius of a circle enclosed by the contour for the smallest radius of curvature. Values of 0.6 times to 0.85 times, in particular 0.7 times to 0.8 times the diameter of the enclosed circle proved particularly suitable. For example, in a drill with a nominal diameter of 4 mm and a minimum radius of 0.75× the diameter of the enclosed circle, approximately 35% lower stress peaks on the side of the cooling channel facing the cutting groove with the same cross-sectional area of the cooling channel resulted. Consequently, a value of only 0.3 mm for the minimum wall thickness at that location was achieved with adequate drill strength. In tools made from some other material, values ranging from 0.35 to 0.9× the radius may be sensible. If a material of greater ductility and thus greater stress resistance, in particular tensile stress resistance, is used, for example minimum radii of curvature down to 0.35× the radius of the enclosed circle can return advantageous results. Even in tools which are exposed to particular load states, such dimensioning can be sensible.

Apart from the reduced stress concentration due to the relatively gentle roundings when compared to conventional trigon profiles, there is an additional effect in that the position of the cooling channel contour which is most curved is moved away from the position at which the wall of the land is thinnest. Consequently, the wall is relatively thick and thus resistant to breakage at the position where the stress is greatest.

In an insert tool featuring the cooling channel geometry according to the invention, the throughput quantities increase almost proportionally to the cross-sectional area when compared to a tool with round cooling channel geometry, wherein the increase in the stress concentration with an increase in the cross-sectional area in the region of the cooling channel geometry according to the invention is surprisingly small when compared to the increase in conventional trigon profiles. Thus, with the cooling channel profile according to the invention, cross-sectional areas can be implemented which in the case of a round profile with the same coolant throughput would lead to tool failure due to insufficient wall spacing.

Tests have shown a correlation between adequate wall thickness and nominal diameter, which correlation in the case of small tool diameters is linear to an increase in tool diameters. Reference is already made to FIGS. 12 to 14 which in diagrammatic form show the lower limit and the upper limit of the minimum wall thickness, in each case above the nominal tool diameter. Tests have shown the following wall thicknesses to be of adequate strength where the coolant supply is extreme: wall thicknesses above a lower limit of 0.08×D for D<=2.5 mm, and 0.2 mm for D>2.5 mm; preferably 0.08×D for D<=3.75 mm, and 0.3 mm for D>3.75 mm, for example 0.1×D for D<=3 mm and 0.3 mm for D>3 mm, wherein D designates the nominal diameter. Thus the above-mentioned tested drill with a nominal diameter of 4 mm for example had a wall thickness of 0.3 mm.

Due to the favorable cooling channel design according to the invention from the point of view of stress distribution in the tool land, even with such thin walls, great tool strength and thus a long service life can be achieved. In individual cases it might even be adequate to provide minimum wall thicknesses of 0.08 mm for diameters from 1 mm onward.

On the other hand, the minimum wall thickness is limited towards the top only by the desired throughput quantity. In this context the following values have proven to be suitable maximum values up to which such a cooling channel contour is sensible: 0.35×D for D<=6 mm, and 0.4×D−0.30 mm for D>6 mm, in particular 0.333×D for D<=6 mm and 0.4×D−0.40 mm for D>6 mm, preferably 0.316×D for D<=6 mm and 0.4×D−0.50 mm for D>6 mm, particularly preferred 0.3×D for D<=6 mm and 0.4×D-0.60 mm for D>6 mm, for example 0.2×D or 0.15×D for D<=4 mm and 0.6 mm for D>4 mm.

It has been shown that the cooling channel geometry according to the invention is in particular suited to smaller tools in which the usage of space on the tool land, which usage is optimized with a view to strength and coolant throughflow, is particularly important. These findings are reflected in the upper limits, according to the invention, for minimum wall thicknesses, which upper limits increase more markedly above a certain nominal diameter when compared to the region of smaller diameter values.

In particular, it has been shown that above diameters of 6 mm, a linear increase in the cooling channel cross-sectional areas with the nominal diameter makes sense only in the case of individual application cases, such as e.g. in the case of deep-hole drills, because the lubricant requirement can be covered also in the case of underproportionally increasing cooling channel cross sections. Of course it can also make sense in the case of larger diameter values for the minimum wall thickness to approach the lower limit according to the invention so as to achieve an excellent coolant supply while providing adequate strength.

The values according to the invention, which values relate to the upper limit of the minimum wall thicknesses, reflect this consideration, wherein the design according to the invention of the cooling channel contour in particular in the case of minimum wall thicknesses in the region below 0.2×D is sensible. In particular, in the minimum wall thickness region below 0.15×D for D<=4 mm and 0.6 mm for D>4 mm, the increase in throughflow achieved by the form and dimensioning, according to the invention, of the cooling channels in relation to the available design space while maintaining good tool strength has been shown to be surprisingly favorable.

However, it has been taken into account that often tools of different diameters are produced from blanks, in particular from sintered blanks, of the same diameter. Commonly, the sintered blanks are cylindrical bars with cooling channels already formed in. In other words, for example tools with nominal diameters of 4 mm, 5 mm and 6 mm are produced from a blank with a diameter of 6.2 mm. In the case of the 6 mm tool with the same cooling channel design as that of the 4 mm tool, the minimum wall thickness between the cooling channel and the external circumference of the tool would thus be larger by 1 mm. Under this production-technology aspect, upper limits for the wall thickness of 0.35×D for D<=6 mm and 0.4×D−0.30 mm for D>6 mm, in particular 0.333×D for D<=6 mm and 0.4×D−0.40 mm for D>6 mm, preferably 0.316×D for D<=6 mm and 0.4×D−

0.50 mm for D>6 mm, particularly preferred 0.3×D for D<=6 mm and 0.4×D–0.60 mm for D>6 mm are still in a region where the cooling channel geometry according to the invention provides advantages.

At this point it should be mentioned that the minimum wall thicknesses between the cooling channel and the external circumference of the drill or the cutting face or cutting flank can of course be selected so as to be different. From the point of view of strength, in particular the minimum distance or the minimum wall thickness between the cooling channel and the cutting face is decisive; said minimum distance can thus be larger in relation to the minimum wall thickness between the cooling channel and the cutting flank. Similarly, in relation to the minimum wall thickness between the cooling channel and the external circumference of the drill, the minimum wall thickness between the cooling channel and the cutting face can be provided with larger values in order to take account of the increased requirement concerning strength. On the other hand, for example in the case of the above-mentioned production aspect, which is relevant in practical applications, where blanks of identical diameter are used for tools of different diameters, there may be a minimum wall thickness between the cooling channel and the external circumference of the drill, which minimum wall thickness is greater than that between the cooling channel and the cutting face.

According to the invention it is thus possible, overall, to utilize the available design space on the land or lands of a rotary cutting tool such that both the coolant throughput and the strength values are greater than have hitherto been achieved. For, due to the form of the cooling channel contour, extremely small minimum wall thicknesses can be provided, wherein, in spite of extreme coolant throughput quantities, adequate strength of the tool is achieved overall.

In this arrangement, the proposed cross-sectional geometry is equally suited to drills, rasps and milling cutters, for example end-milling cutters. It should be mentioned that the cooling channel geometry according to the invention can also be used to advantage in the case of step tools, for example step drills. In this case the nominal diameter stated thus refers to the tool diameter at the tool tip, or to the diameter of the pilot drill hole.

Drills with the rounded cooling channel profile according to the invention can thus withstand high load values without being destroyed over long service lives both when subjected to loads by pressure forces and torsional forces (as they are typical during drilling) and when subjected to transverse loads and loads resulting from moments of flexion (as they occur during entry into the workpiece to be machined). Similar transverse loads and loads resulting from moments of flexion also occur with cut-down milling machines or opposed milling machines. On the other hand, the achieved coolant throughput meets the stringent requirements in relation to quantity and pressure drop along the length of the tool.

Due to the low stress concentration in the case of the cooling channel geometry according to the invention, it is thus possible on the one hand with identical wall thicknesses to achieve significantly improved stability when compared to conventional insert tools in the case of at least approximately the same throughput quantities; or on the other hand to reduce the minimum wall thickness between the cooling channel and the cutting face, as a result of which the cross section of the cooling channel, and thus the throughput, increase correspondingly.

The effect wherein due to the large radii a favourable hydraulic radius, i.e. a large cross-sectional area of the cooling channel in relation to the enveloping lateral surface of the cooling channel, results, contributes to an increase in the coolant throughput with a reduction in the pressure drop. The average flow speed, which significantly depends on the frictional force in the pipe and the counterforce generated by the pressure drop, is thus greater than that of conventional trigon profiles so that with the same cross-sectional area greater throughput is achieved.

The cooling channel geometry according to the invention is thus particularly suited to tools where the conflict between adequate coolant supply on the one hand and adequate strength on the other hand is particularly problematic, as a rule this is thus the case with tools of a small diameter and/or long tool length. According to a preferred aspect of the present invention, the nominal diameter ranges from 1 mm to 25 mm, in particular 1 mm to 16 mm. However, the advantages of the cooling channel geometry according to the invention are particularly significant in the case of even smaller tools whose nominal diameter ranges from 1 mm to 12 mm, in particular from 1 mm to 6 mm.

However, even in the case of larger tool diameters, the cross-sectional geometry according to the invention can be sensible to obtain maximum coolant supply, in particular in the case of deep-hole drilling where the coolant is pressed into the internal cooling channels at up to 1000 bar so as to provide sufficient pressure to push the chips out of the drill hole.

The cross-sectional geometry according to the invention can for example be applied with single-lip drills. However, it is particularly advantageous in the case of two-lip tools or multiple-lip tools because in those cases the narrow land widths are also associated with correspondingly more confined design space for the internal cooling channels. Furthermore, the cooling channel geometry according to the invention is suited to both straight-grooved and helical or spiral-shaped tools.

In another preferred aspect of the present invention, the cross-sectional contour comprises two curvature maxima which are on the same radial coordinate, which is greater than or equal to the radial coordinate of the circle enclosed by the cooling channel cross section. In another preferred aspect of the present invention, the applied radius is the same on two curvature maxima; in another preferred aspect of the present invention, the cooling channel cross section is symmetrical in relation to an axis extending radially in relation to the drill axis. These improvements reflect the essentially symmetrical shape of the tool lands and thus reflect the design space available for the cooling channel cross section on the land while maintaining the minimum wall thicknesses determined in trials. Apart from this, an asymmetrical shape of the cooling channel cross sections is also imaginable—in particular, if widening of the lands in radial direction on the side of the main cutter starts before widening on the side facing the back of the land—in order to make optimal use of the available design space. Asymmetrical designs can also be considered in view of the fact that the greatest loads are experienced on the side of the cooling channel facing the main cutter, while on the side facing the back of the land, relatively lesser loads are experienced.

In another preferred aspect of the present invention, the cross section of the cooling channel is elliptical in shape. Preferred values of the ratio between the main axis of the ellipse and the secondary axis are 1.18 to 1.65, particularly preferred are 1.25 to 1.43, for example 1.43. The term ellipse in the context of the invention is not limited to a mathematically precise ellipse ($x^2/a^2+y^2/b^2=1$) but also to a production technology ellipse, i.e. an approximate ellipse.

In the case of straight-grooved HSS drills, an ellipse with a large cooling channel cross section may additionally be milled in. In this process, a milling cutter whose radius is the same as that of the smallest radius of the ellipse is used to produce an elliptical drill hole in the tool land in that—starting with the smallest radius—at the curvature maxima, the process progresses to the largest radius on the curvature minima. In this process, the radii do not change gradually, but only in the region of the transition from the largest radius to the smallest radius, while the smallest radius on the curvature maxima is maintained along a length which deviates from zero.

However, not only tools with spiral-shaped cooling channels are preferably produced from hard metal, for example on a tungsten carbide base. In this arrangement, the plasticised material for extrusion pressing is produced by constant working from a hard metal powder with the addition of a binder, for example cobalt, and a plasticiser, for example paraffin. The use of ceramics or cermet as well as other sintering materials in which the cross-sectional geometry of the cooling channels can be defined while the raw material is still soft, before the tool hardens—for example in an extrusion press method—is also possible. In this context, reference is made for example to the printed patent specification DE 42 42 336 A1, which has already been mentioned in the introduction. However, in theory it is imaginable in the case of spiral tools too, to incorporate the cooling channel cross-sectional geometry according to the invention also in tools made from high-speed steel (HSS) or similar steels, for example with the use of a laser sintering process.

Below, a further extrusion press method is also mentioned that is suited for producing spiral tools with the cooling channel geometry according to the invention.

In this method, the plasticized material in an extrusion press head first flows in an essentially twist-free manner into a mouthpiece of the nozzle and thereafter is pressed along the longitudinal axis of the pin, of which there is at least one, which pin is stably attached to the gudgeon of the nozzle, in the mouthpiece of the nozzle before being pressed through the exit aperture. In this arrangement the mouthpiece of the nozzle comprises a circular cylindrical, preferably essentially smooth, surface so that the blank being produced has a fully cylindrical external contour. The pin along which the material flows is attached to the gudgeon of the nozzle so as to be nonrotational. In this arrangement, not only as a result of the pitch of the spirals of the pin, but also as a result of a rotating section of the nozzle, a radial component is induced by a rotating section of the nozzle.

In this way, an overall helical flow is achieved which, if the rotary speed is attuned, flows on the rotating section in relation to the pitch of the spiral shape of the pin protruding into the mouth of the nozzle in such a way that the flow of the extrusion press material essentially follows the spiral pitch, i.e. that the particles at radial height of the pin have a flow direction which corresponds to the design of the pin, as a result of which bending-deformation of the pin or pins can be prevented despite the pin's or the pins' fixed position and nonrotational arrangement. Furthermore, plastic deformation of the extrusion press material or uneven microstructure formation or density distribution in the material can be prevented because the radial component of the flow is not imposed for example by twisting devices or deflection devices such as guide vanes etc. but is exclusively achieved by rotational movement of the rotary section of the nozzle.

The radial movement of the flow is thus not caused by deflection at one of the obstacles in the way of the flow, but solely by way of the frictional forces inherent in the extrusion press material, which frictional forces cause the material to be taken along by the rotational movement of the nozzle section. As a result of this, the rotary movement induced in this way, emanating from the nozzle wall, independently extends towards the interior of the nozzle until a stationary helical flow occurs, namely in a relationship which depends on the transverse stress and thus on the viscosity and tenacity of the extrusion press material.

The result is a microstructure of the extrusion press material that is largely free from distortion and inhomogeneities relating to density so that after the blank has been pressed from the nozzle, no subsequent twirling-on is to be feared, as is the case in a helical flow imposed by a twisting device. The method according to the invention thus makes it possible to produce green compacts with excellent helical accuracy.

In the case of elliptical cooling channel cross sections, due to the low stress concentration on the curvature maxima, the cooling channel can have a thinner minimum wall thickness between the cooling channel and the main cutter than is the case in designs where the curvature maxima are placed radially further outward, because there the radii of curvature are smaller than in the elliptical design.

Apart from the elliptical cooling channel shape, there are however also further tool designs which are advantageous, in particular from the point of view of production technology, in which the cooling channel contour does not describe an ellipse.

In particular, in the case of spiral-shaped tools, with a cooling channel geometry in which the maxima of curvature are displaced towards the outside in relation to the center of the enclosed circle, from the point of view of production technology, it is easier to control the production process of the pins used in the extrusion press method, which pins determine the helix of the internal cooling channels. The spiral pins used in the extrusion press method for producing the cooling channels are arranged on a gudgeon upstream of an extrusion press nozzle and thus form the cooling channels in the inflowing material. While the production of elliptical helical pins is relatively difficult, the production of spiral pins with outward-moved maxima of curvature is comparatively simple due to the relatively large contour sections on the inside of the wires, which contour sections are available for precise fit on a drawing form.

In this regard, it is particularly advantageous if the radially inward side of the cooling channel contour comprises straight limb sections by which the wires can be safely supported in the drawing form during spiralling.

Trials and simulations have shown that with such cooling channel cross sections, similarly good results in relation to stress concentration and coolant throughput can be achieved as is the case with ellipsoid cooling channel cross sections, provided adequate minimum radii and minimum wall thicknesses are maintained. Due to smaller radii on the maxima of curvature, when compared to the elliptical shape, the minimum wall thicknesses are however greater.

The characteristics of the present invention as described herein can be combined in any desired way where this is sensible.

It should be stressed that any common materials for modern high-performance drills can be used as materials for the drill, e.g. HSS high-speed steel, and in particular also all types of hard metal. Apart from this, ceramic, cermet or other sinter metal materials are also suitable for producing the tool according to the invention.

Moreover, the tool or tool component according to the invention can comprise the usual coatings, at least in the region of the sharp cutters. In the case of a hard-material coating, such coating is preferably a thin coating, with the thickness of the coating preferably ranging from 0.5 to 3 μm.

The hard-material coating can for example comprise diamond, preferably monocrystalline diamond. But it can also be produced as a titanium nitride or a titanium aluminum nitride coating because such coatings are deposited so as to be adequately thin. Other hard-material coatings are also imaginable, for example TiC, Ti (C, N), ceramics, e.g. $Al_2O_3$, NbC, HfN, Ti (C, O, N), multilayer coatings comprising TiC/Ti(C, N) TiN, multilayer ceramic coatings, in particular comprising intermediate layers of TiN or Ti (C, N), etc.

In addition or as an alternative it is also possible to use a soft-material coating which is present at least in the region of the grooves. Such a soft-material coating preferably comprises $MOS_2$.

BRIEF DESCRIPTION OF THE DRAWING FIGURES

Below, preferred embodiments of the invention are explained in more detail with reference to diagrammatic drawings. The following are shown:

Figure 12:
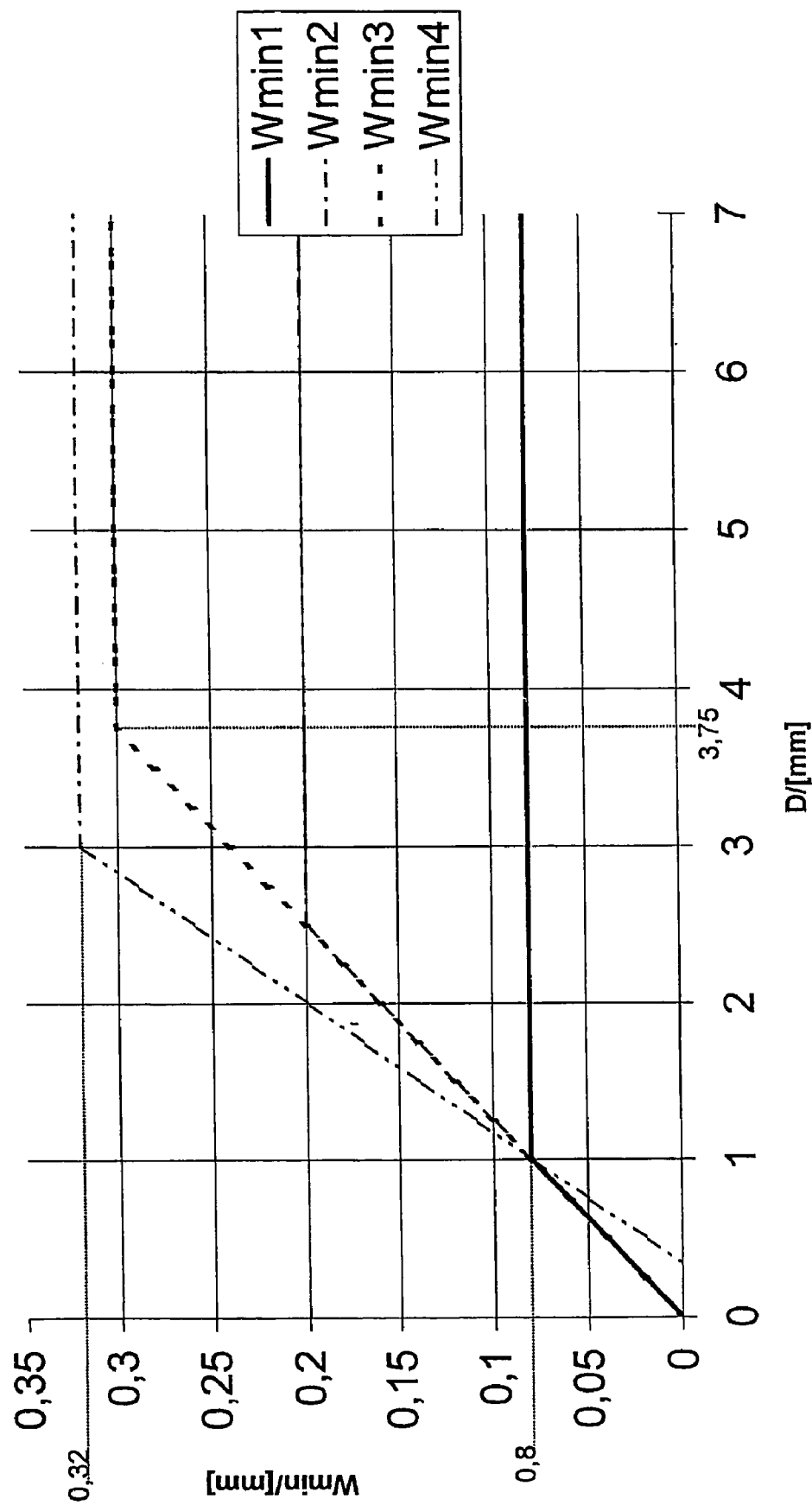
Figure 13:
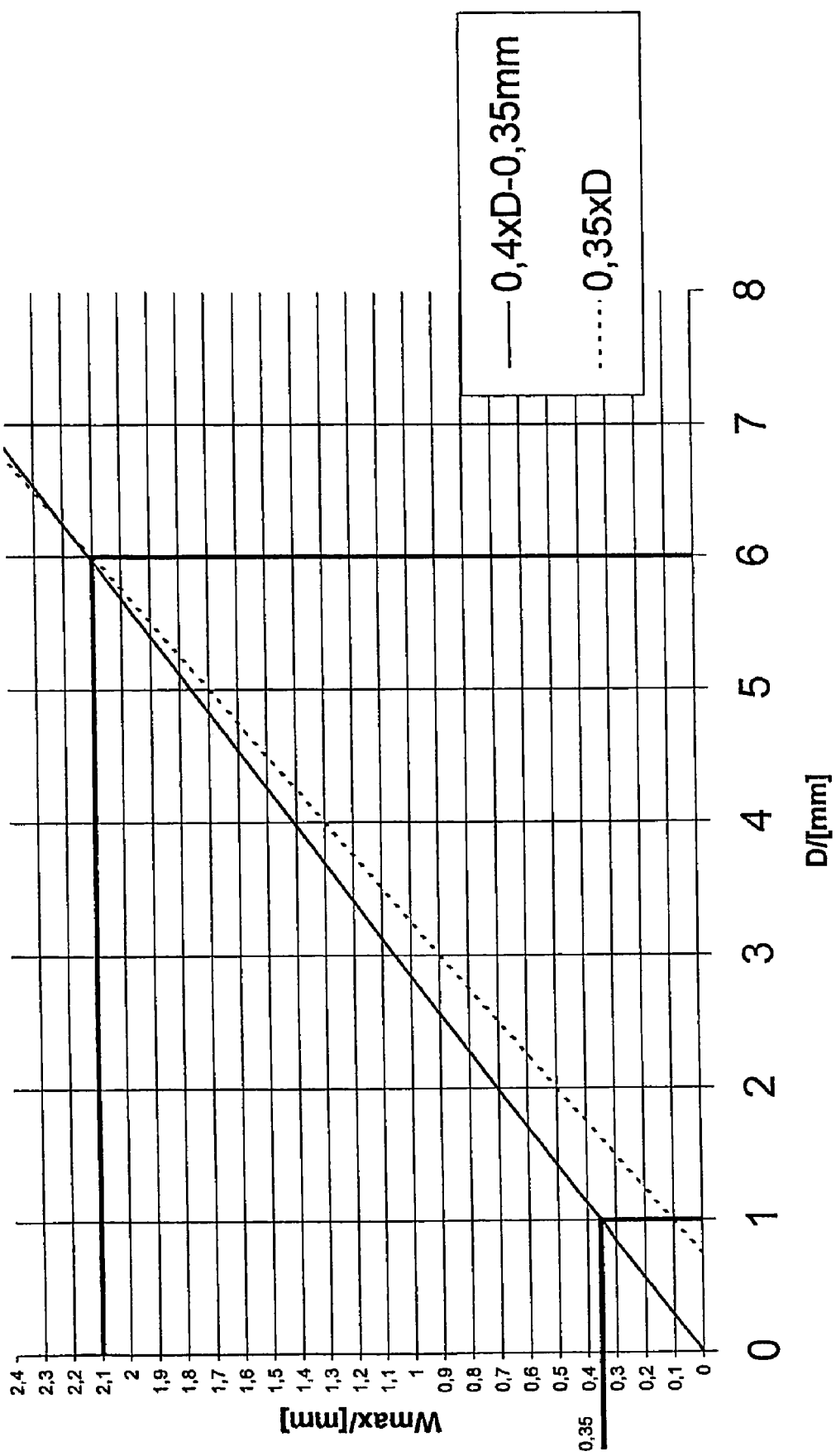
Figure 14:
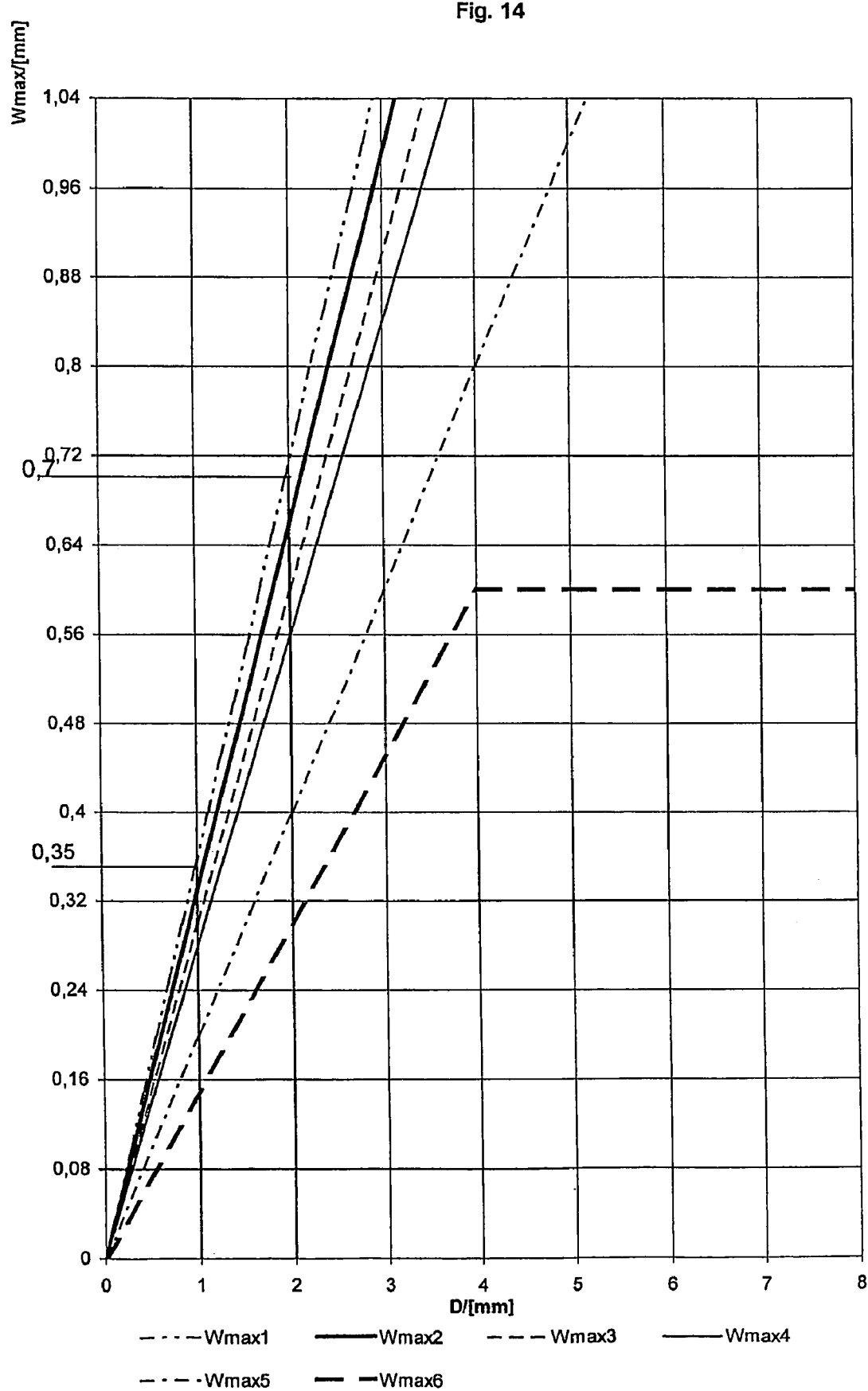

FIG. 12 shows a diagram in which lower limits $W_{min,\ 1}$, $W_{min,\ 2}$, $W_{min,\ 3}$, $W_{min,\ 4}$ according to the invention are entered in relation to the minimum wall thicknesses between the cooling channel and the external circumference of the drill ($d_{AUX}$), the cooling channel and the cutting face ($d_{SPX}$), as well as the cooling channel and the cutting flank ($d_{SFX}$) above the nominal diameter of the drill;

FIG. 13 shows a diagram in which the upper limit $W_{max,\ 1}$, according to the invention is entered in relation to the minimum wall thicknesses between the cooling channel and the external circumference of the drill ($d_{AUX}$), the cooling channel and the cutting face ($d_{SPX}$), as well as the cooling channel and the cutting flank ($d_{SFX}$) above the nominal diameter of the drill; and FIG. 14 shows a diagram in which upper limits $W_{max,\ 1}$, $W_{max,\ 2}$, $W_{max,\ 3}$, $W_{max,\ 4}$, $W_{max,\ 5}$, $W_{max,\ 6}$ according to the invention are entered in relation to the minimum wall thicknesses between the cooling channel and the external circumference of the drill ($d_{AUX}$), the cooling channel and the cutting face ($d_{SPX}$), as well as the cooling channel and the cutting flank ($d_{SFX}$) above the nominal diameter of the drill.

DETAILED DESCRIPTION OF THE INVENTION

Figure 1:
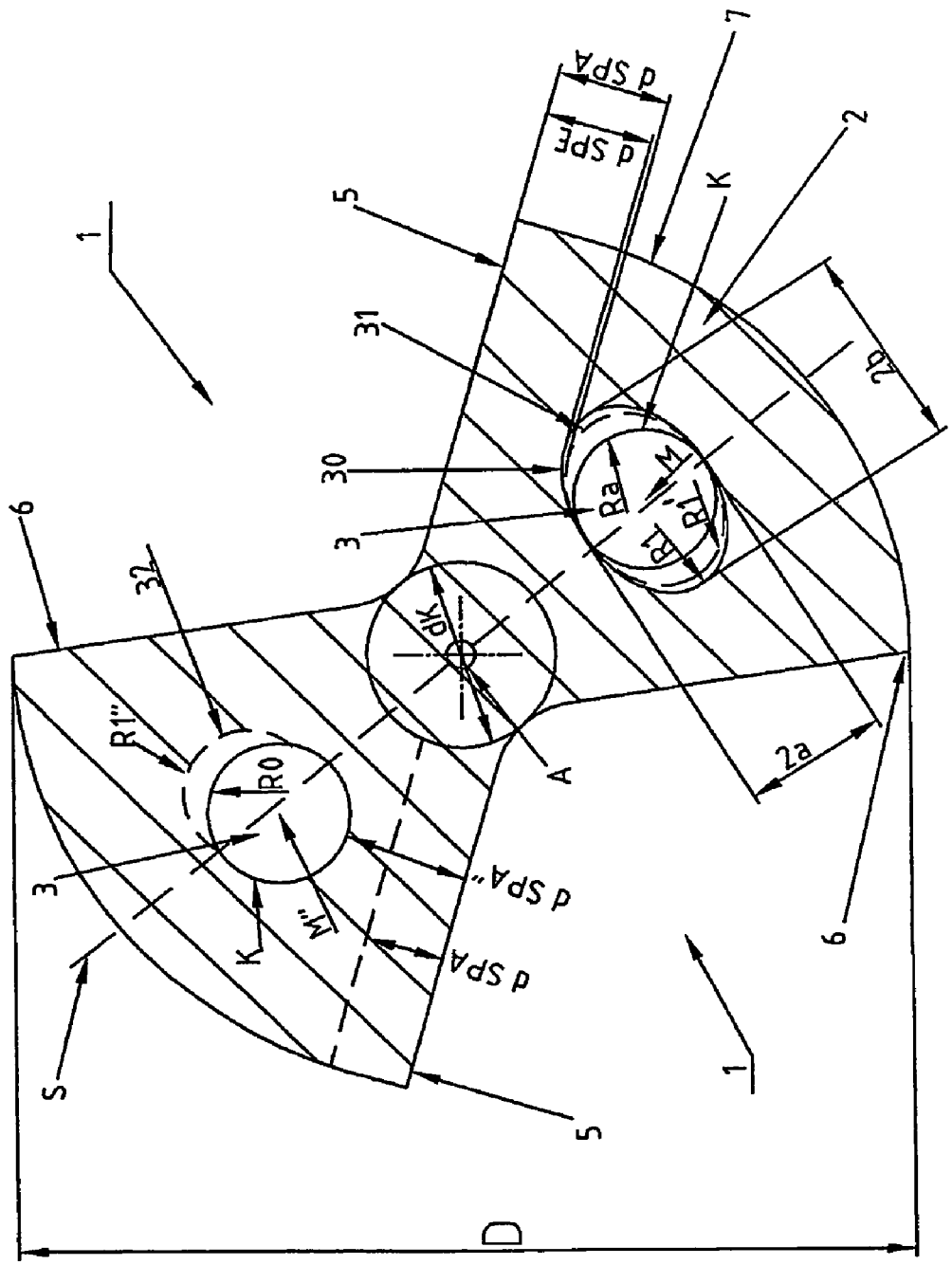
FIG. 1 shows a cross-sectional view of a double cutting drill tool, wherein several cooling channel contours according to the invention are shown in the drawing.

First, reference is made to FIG. 1 which shows a cross-sectional view of a double cutting drill with two lands 2 and two cutting grooves 1. On the cutting side, the lands are delimited by a cutting face 5, while on the non-cutting side they are delimited by a cutting flank 6. The external circumference of the drill is designated 7. Starting with a drill core of a diameter $d_K$, the cutting face 5 and the cutting flank 6 widen the lands 2 to such a land width that the nominal diameter D of the drill is reached. In this arrangement, the lands 2 are approximately symmetrical in relation to a land centre line S, which in the drawing is shown radially in relation to the drill axis A. On the symmetry line S on the lower land 2 there is the centre M of a circle K which is located completely within the cross-sectional area of the respective cooling channel hole 3. On the upper land there is the centre M" of the respective circle K of the same diameter $2R_o$, slightly displaced away from the cutting face towards the rear, located completely within the cross-sectional area of the respective cooling channel hole 3.

In the above process, several cooling channel contours 30, 31, 32, which surround the respective cooling channel, were compared with each other according to various embodiments of the invention. The lower land shows an elliptical contour 30 of the cooling channel 3 in a solid line, and a further contour 31 of the cooling channel 3 in a dashed line. On the upper land, a contour 32 of the cooling channel 3 is shown in a dashed line.

In this arrangement the cooling channel contours 30, 31 have a symmetrical shape in relation to the line of symmetry, while the cooling channel 32 deviates from the contour defined by the tangentially enclosed circle K only on the non-cutting side. At the curvature maxima, there are the respective radii of curvature $R_1$, $R_1'$ and $R_1''$, wherein the contours 30, 31 comprise two equally curved curvature maxima while contour 32 has only one curvature maximum with a radius $R_1''$.

The figure shows that using the cooling channel cross-sectional geometry according to the invention while maintaining the same distance to the core diameter $d_K$, which distance cooling channel holes of circular diameter $2R_0$ would have, a significant increase in the throughput area in the regions of the cooling channel, which regions of the cooling channel face the cutting face or the cutting flank, can be achieved.

In this arrangement the gain in throughput area is only limited by the minimum wall thicknesses that have to be observed, wherein for the sake of clarity the figure only shows the minimum wall thickness $d_{SPE}$, $d_{SPA}$ and $d_{SPA}"$—which is particularly important to provide breakage resistance to the drill—between the cooling channel 3 and the cutting face 5 in relation to each of the cooling channel contours 30, 31, 32.

In turn, the minimum wall thicknesses are only prescribed by the minimum strength which the drill is to attain, and thus also by the radii $R_1$ or $R_1'$ or $R_1"$ at the curvature maxima of the respective cooling channel contour 30, 31, 32. This is reflected in that for the elliptical cooling channel contour 30 it is possible to use a lesser minimum wall thickness $d_{SPE}$ than for the cooling channel contours 31, 32 with outward-displaced curvature maxima (minimum wall thickness $d_{SPA}$).

In this arrangement, the cooling channel contours 30, 31 maintain the minimum wall thickness $d_{SPE}$ or $d_{SPA}$ between the cooling channel 3 and the cutting face 5, which minimum wall thickness essentially corresponds to the minimum wall thickness (no designation) between the cooling channel 3 and the cutting flank 6. In contrast to this, for example the contour 32 on the side facing the cutting face 5 has a greater minimum wall thickness $d_{SPA}"$ than on the side facing away from the cutting face 5. For, on the one hand the centre M" of the enclosed circle is displaced away from the cutting side, and on the other hand the cooling channel contour 32 has a curvature maximum (radius $R_1"$) only on the side facing the cutting flank 6. The arrangement of the cooling channel contour 32 further shows that in the context of the invention, cooling channel cross-sections are also imaginable in which the curvature maximum is located on the side facing the cutting face.

Figure 2:
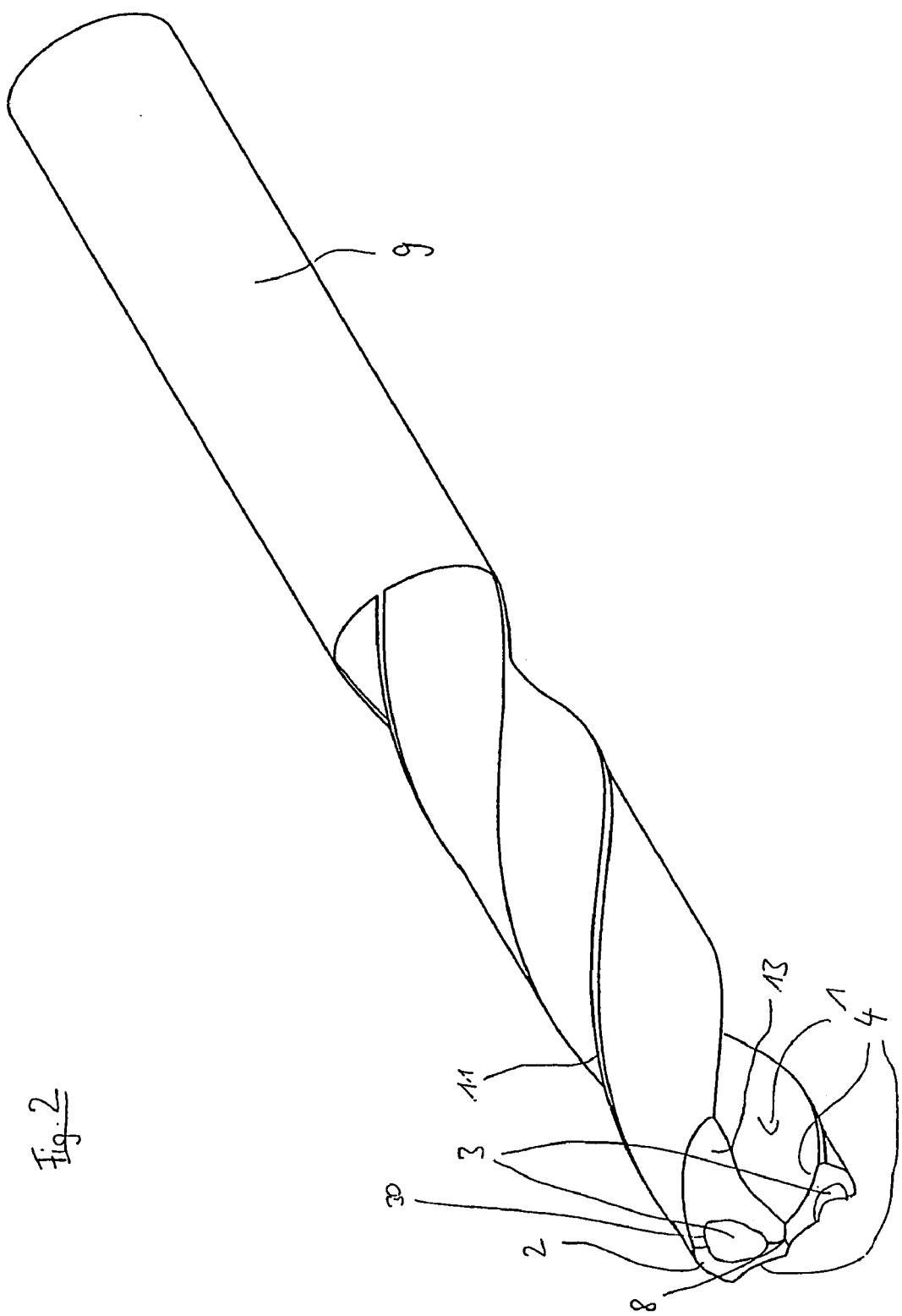
FIG. 2 shows an isometric view of a drill tool with one of the embodiments of the cooling channel as shown in FIG. 1.

FIG. 2 shows an isometric view of a spiral drill tool with an elliptical cross-sectional contour 30. At its two lands 2, which are separated from each other by the spiral cutting grooves 1, the tool comprises a main cutter 4. The cutting grooves 1 and lands 2 spirally extend at a spiral angle of approximately 30° up to a drill shaft 9, designed as a full cylinder, by which drill shaft 9 the tool can be clamped in a tool carrier or chuck. The internal cooling channels 3 extend through the entire tool and are twisted at the same spiral angle as the cutting grooves 1 and the lands 2.

Where particularly great loads are experienced, drill tools made of solid hard material are used, which material provides excellent pressure resistance, resistance to deformation, hardness, and resistance to wear. Such high-performance tools also withstand the very considerable loads encountered for example in hard machining, dry machining, minimum quantity lubrication and high-speed cutting HSC. Furthermore, it has been recognized that the objectives of minimum quantity lubrication ability and significantly increased cutting performance are not mutually exclusive but instead can be implemented at the same time. Drilling tools which were developed for use with minimum quantity lubrication operate for example with significantly increased feed rates when compared to tools for conventional coolant lubrication. In this process the quantity of coolant supplied plays a decisive role.

Nowadays, in so-called high-performance cutting (HPC) processes there are ongoing attempts to further reduce production costs, taking into account all process parameters involved. In the case of tools, apart from their production costs, it is above all the essential operating times and the service life that are decisive, and these in turn decisively depend on the achievable feed speeds and thus on the rotary speeds achievable in existing machine tools/high-performance spindles.

In this context the feed speed is not only limited by the rotary speed but also by the necessity to prevent blockages in the chip removal process. The spiral tool shown in FIG. 2 has decisive advantages in this respect when compared to straight-grooved tools—in this context, reference is made to FIGS. 4, 6, 8 and 10. The spiral design ensures better removal of the mixture comprising chips and lubricant. In the tool shown in FIG. 2, the coolant is largely introduced directly into the cutting groove 1 because the exit surface of the cooling channels 3 extends across both sections of the free surface 13 which is divided by a so-called four-surface-grind pattern, so that the bulk of the coolant flows directly into the cutting groove. In order to further improve the chip-removal flow, it is also imaginable to design the spiral cutting groove so that, starting from the drill tip, it enlarges towards the drill shaft. As far as centring accuracy is concerned, spiral tools are also advantageous because such tools can be supported in the drill hole by their entire outer periphery. To this effect, the tool shown in FIG. 2 comprises a supporting land 11 which starts at the corner of the main cutter.

On the other hand, the stress in a tool must not rise above a supported degree, otherwise fractures or wear will occur. This again shows that the design of the cooling channels is a decisive criterion in the usability of a drill.

Finally, the cooling channel geometry according to the invention underwent various experiments. In this process a number of tools of identical nominal diameter and of identical design except for the cooling geometry were subjected to a load which comprised pressure fractions and torsion fractions, wherein the stress peaks occurring at the groove roots, i.e. the curvature maxima of the cross-sectional contours of the cooling channels, were determined.

For example, six double cutting drills with straight grooves with a nominal diameter of D=4 mm and a land widening arranged in a linear way, with a ratio of land width to groove width of 1:1 were subjected to a pressure force of 860 N and to a torsional moment of 0.8 Nm. These drills are shown in FIGS. 1 and 3 to 11.

The drill with a circular cooling channel profile is shown in FIG. 1 (everywhere, the cooling channel contour follows the enclosed circle with a radius of $R_0$). FIGS. 3 to 10 show four drills with cooling channel contours according to the invention at an enlarged scale. Each of the shown cooling channel profiles 30E (FIGS. 3, 4), 30I (FIGS. 5, 6), 30II (FIGS. 7, 8) and 30III (FIGS. 9, 10) encloses the circle of radius $R_0$ in a tangential manner. Identical characteristics are designated with the same reference characteristics as those in FIG. 1.

FIGS. 4, 6, 8 and 10 each show an isometric view of a drill according to one embodiment of the invention. In this arrangement, the drills comprise straight cutting grooves 1 and lands 2 with guide lands 11, 12 on the side of the main cutter 4 and on the side facing away from the main cutter 4. Cooling channels 3 extend through the drills from the drill tip 8 to the opposite end of the drill at the drill shaft 9. In this arrangement the cooling channels 3 exit at the free surface (not designated) of the drill, which free surface is delimited towards the rear by a point shape 10 for the purpose of shortening the transverse cutter. FIGS. 3, 5, 7 and 9 show a drill cross section of the drills shown in FIGS. 4, 6, 8 and 10, wherein a cooling channel designed according to the invention on the lower drill land for the purpose of comparison is compared with a cooling channel of a conventional trigon profile on each upper drill land.

Figure 11:
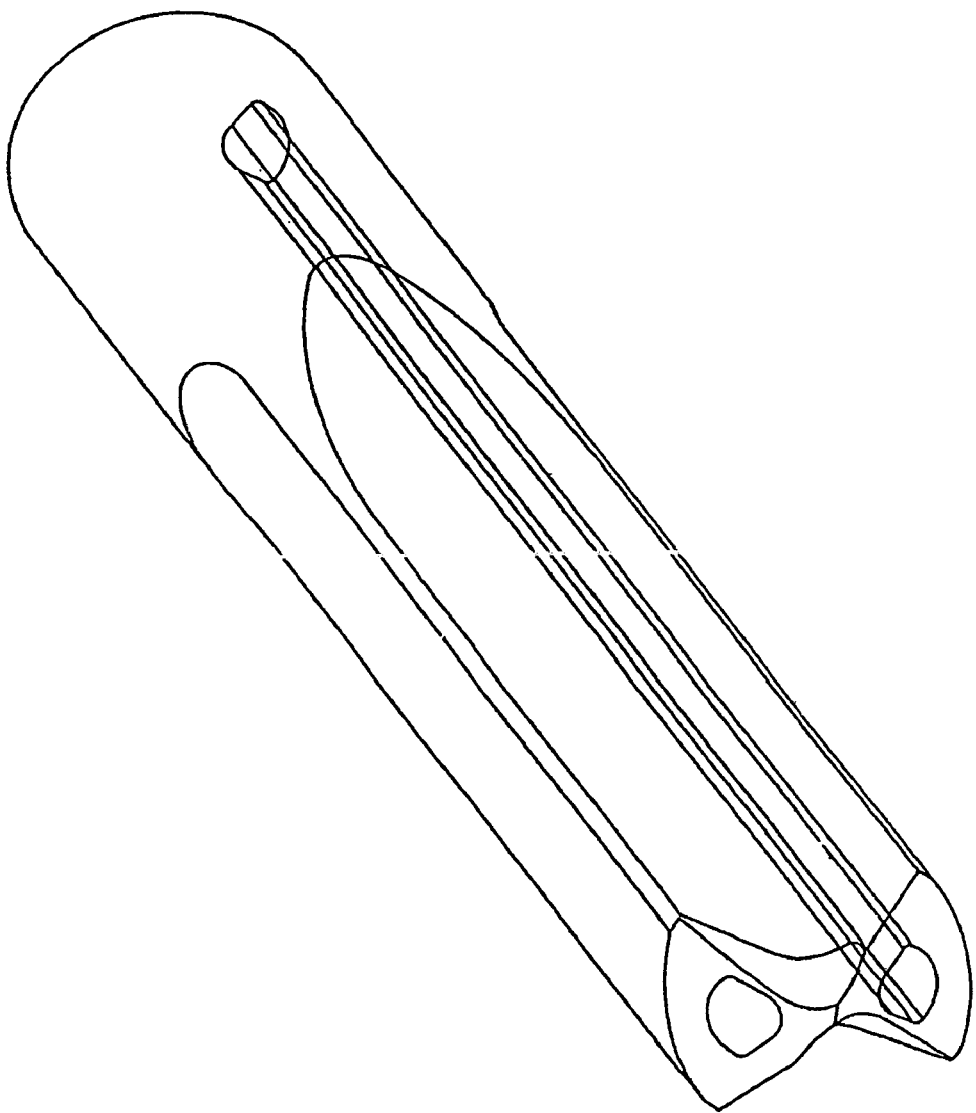
FIG. 11 shows a comparable tool with commonly used trigonal cooling channel cross-sectional geometry.

FIG. 11 shows an isometric view of a drill with a conventional trigonal cooling channel profile at an identical circle with a radius of $R_0$. In each of the cross-sectional views of FIGS. 2, 4, 6, 8 a cooling channel profile designed in this way is compared to a cooling channel profile according to the invention.

The designation $d_{SPX}$ refers to the minimum wall thickness between the cooling channel 3 and the cutting face S. The designation $d_{SFX}$ refers to the minimum wall thickness between the cooling channel 3 and the cutting flank 6. The designation $d_{AUX}$ refers to the minimum wall thickness between the cooling channel 3 and the external circumference 7. $R_{1X}$ in each case designates the smallest radius of curvature of the cooling channel contour. $R_{2X}$ in each case designates the largest radius of the cooling channel contour. X represents E, T, I, II, or III (corresponding to the reference characters depicted in the Figures in the present specification. The respective values in a trigonal cooling channel profile are designated $D_{SPT}$, $D_{SFT}$ and $D_{AUT}$.

Figure 3:
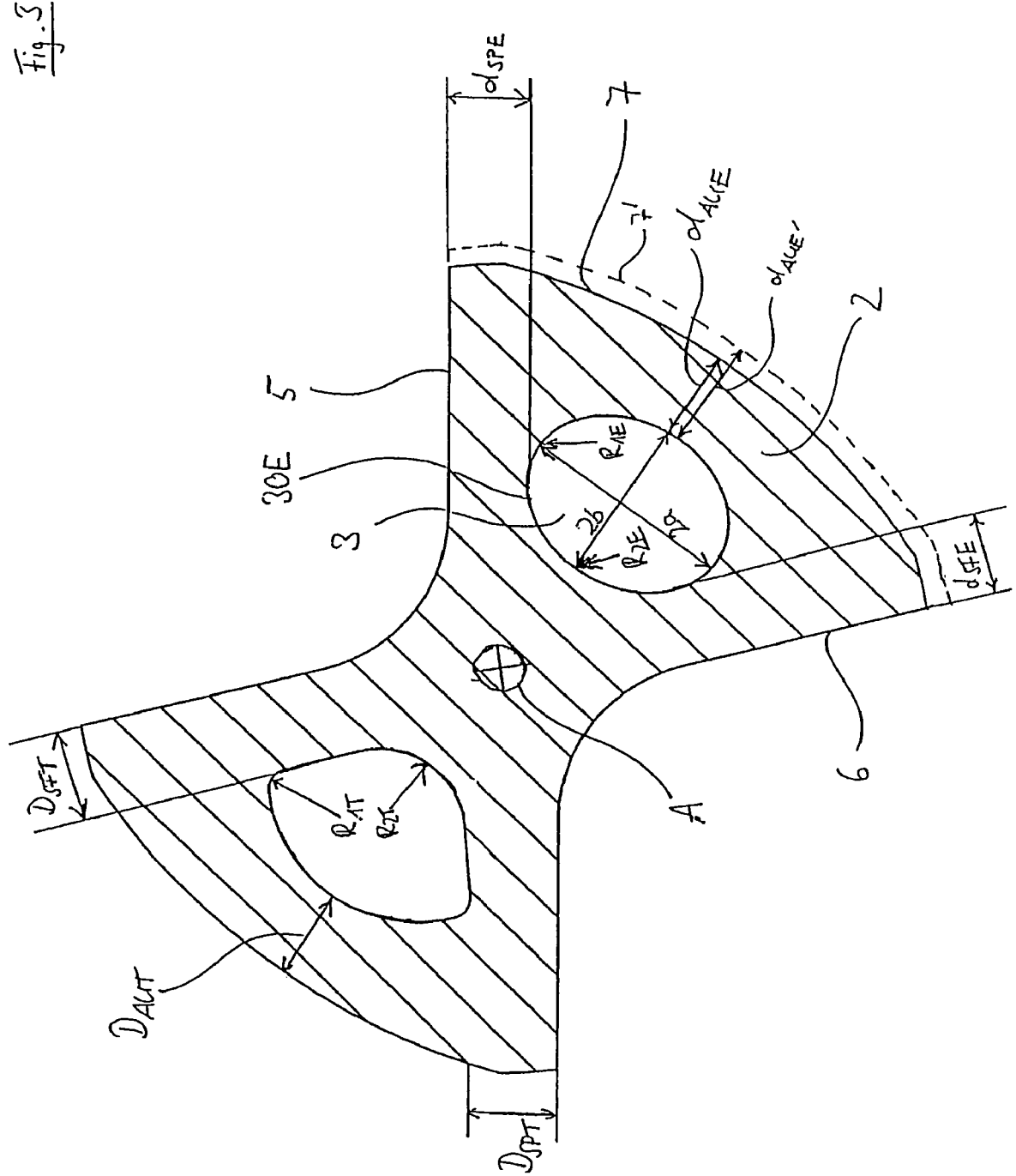
FIG. 3 shows a cross-sectional view of a double cutting drill tool, wherein the upper land shows a conventional trigonal cooling channel contour, while the lower land shows a cooling channel contour according to one embodiment of the invention.
Figure 4:
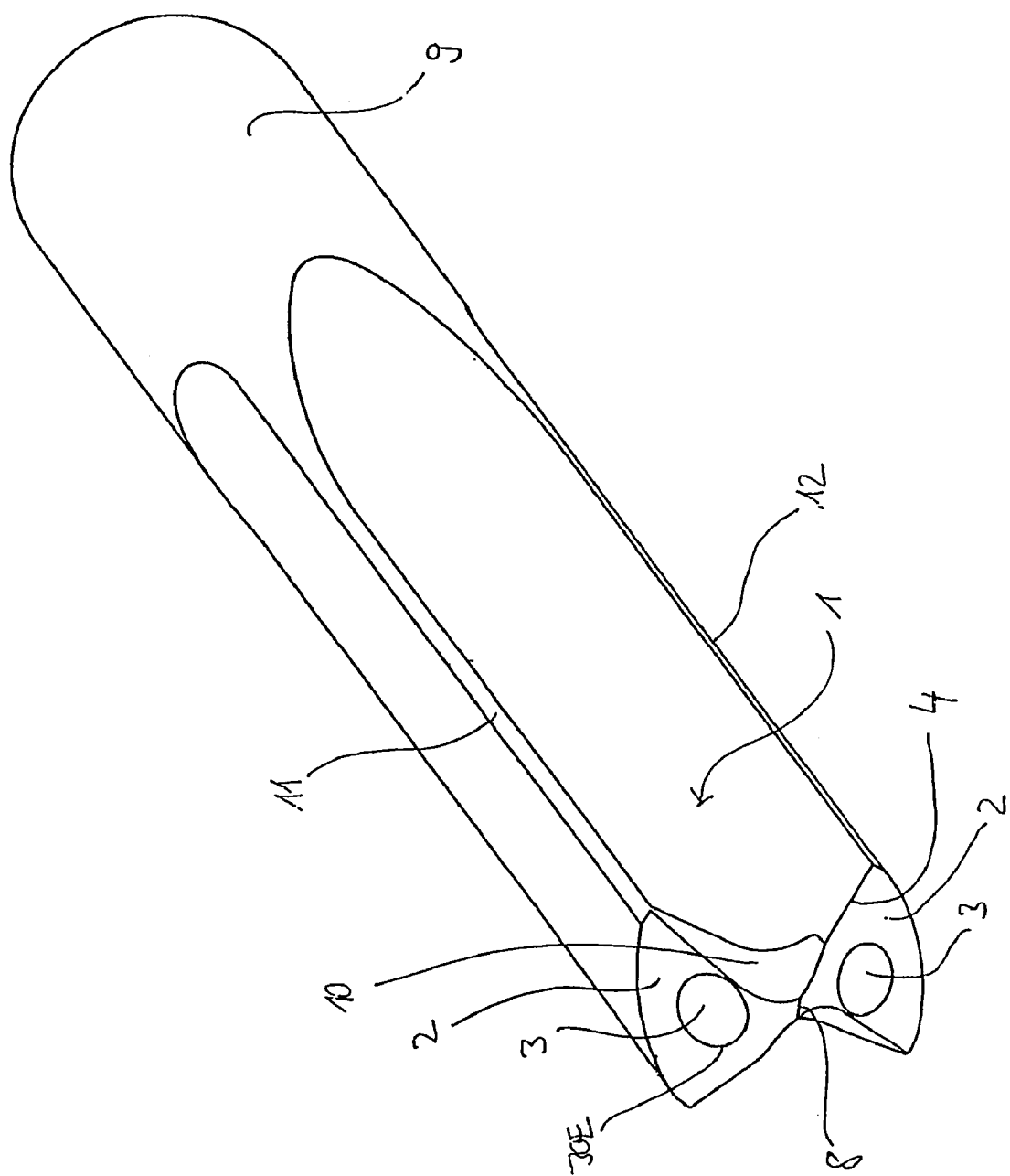
FIG. 4 shows an isometric view of a drill tool with the embodiment of the cooling channel shown in FIG. 3.
Figure 5:
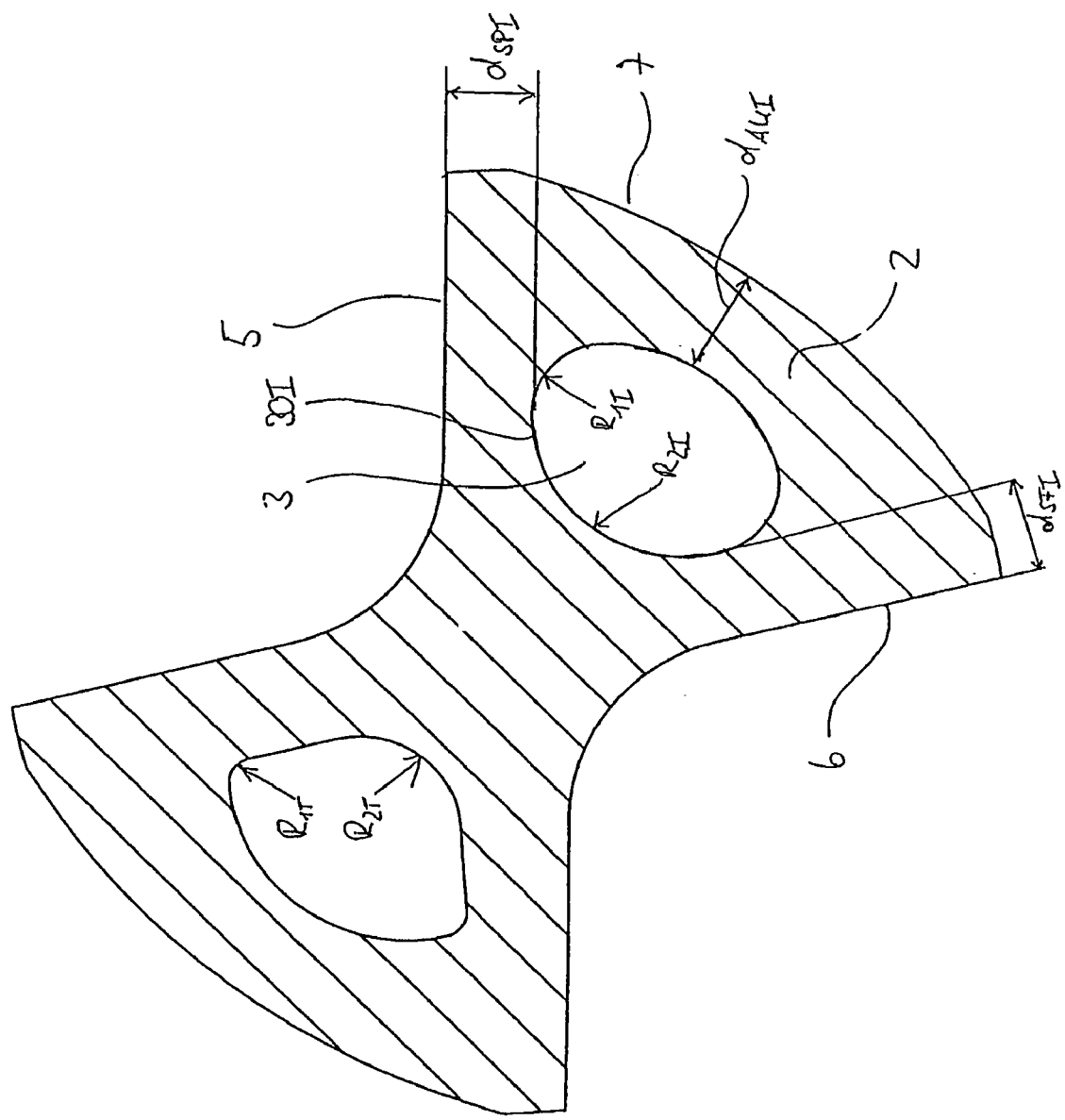
FIG. 5 shows a cross-sectional view of a double cutting drill tool, wherein the upper land shows a conventional trigonal cooling channel contour, while the lower land shows a cooling channel contour according to a further embodiment of the invention.
Figure 6:
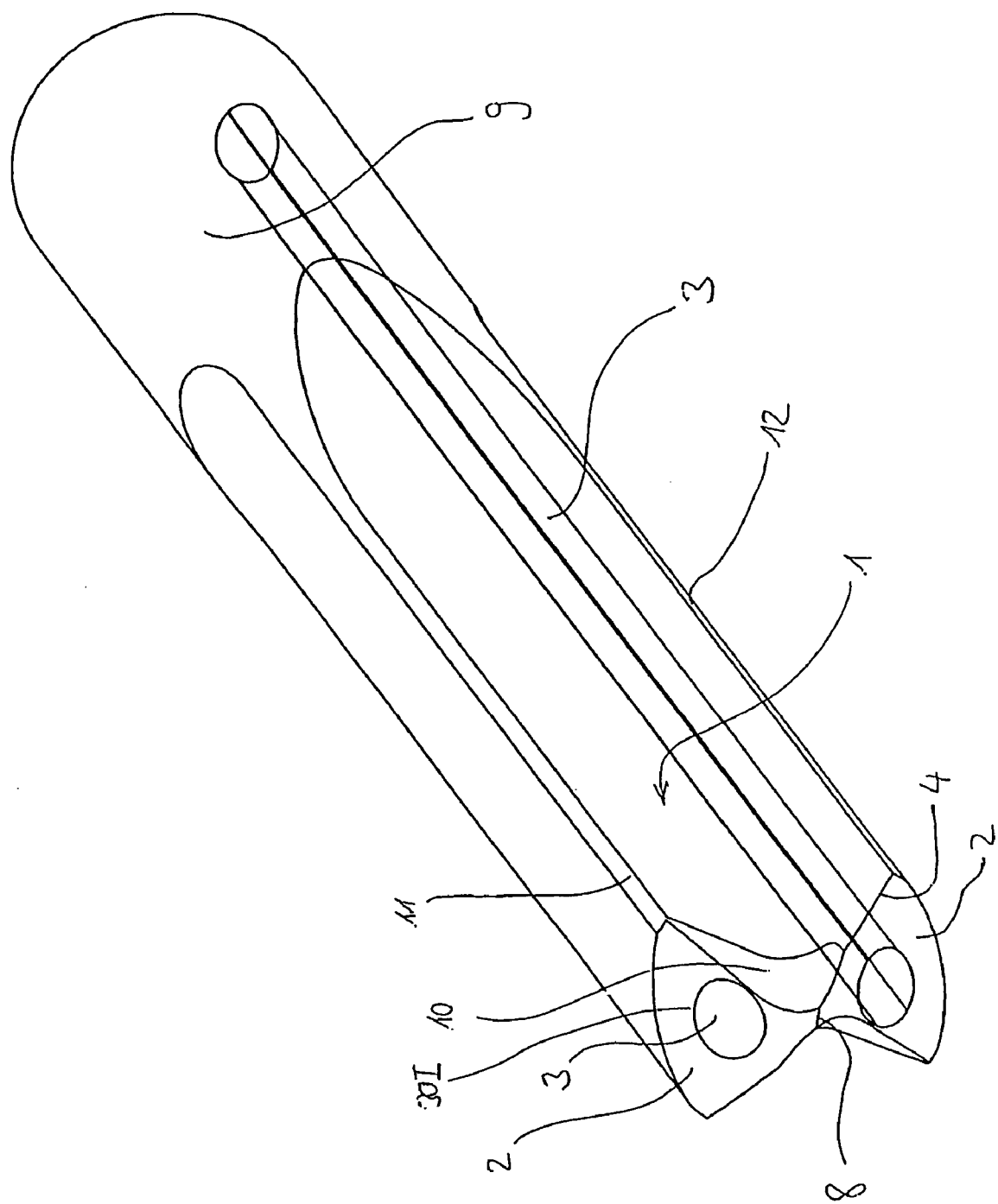
FIG. 6 shows an isometric view of a drill tool with the embodiment of the cooling channel shown in FIG. 5.
Figure 7:
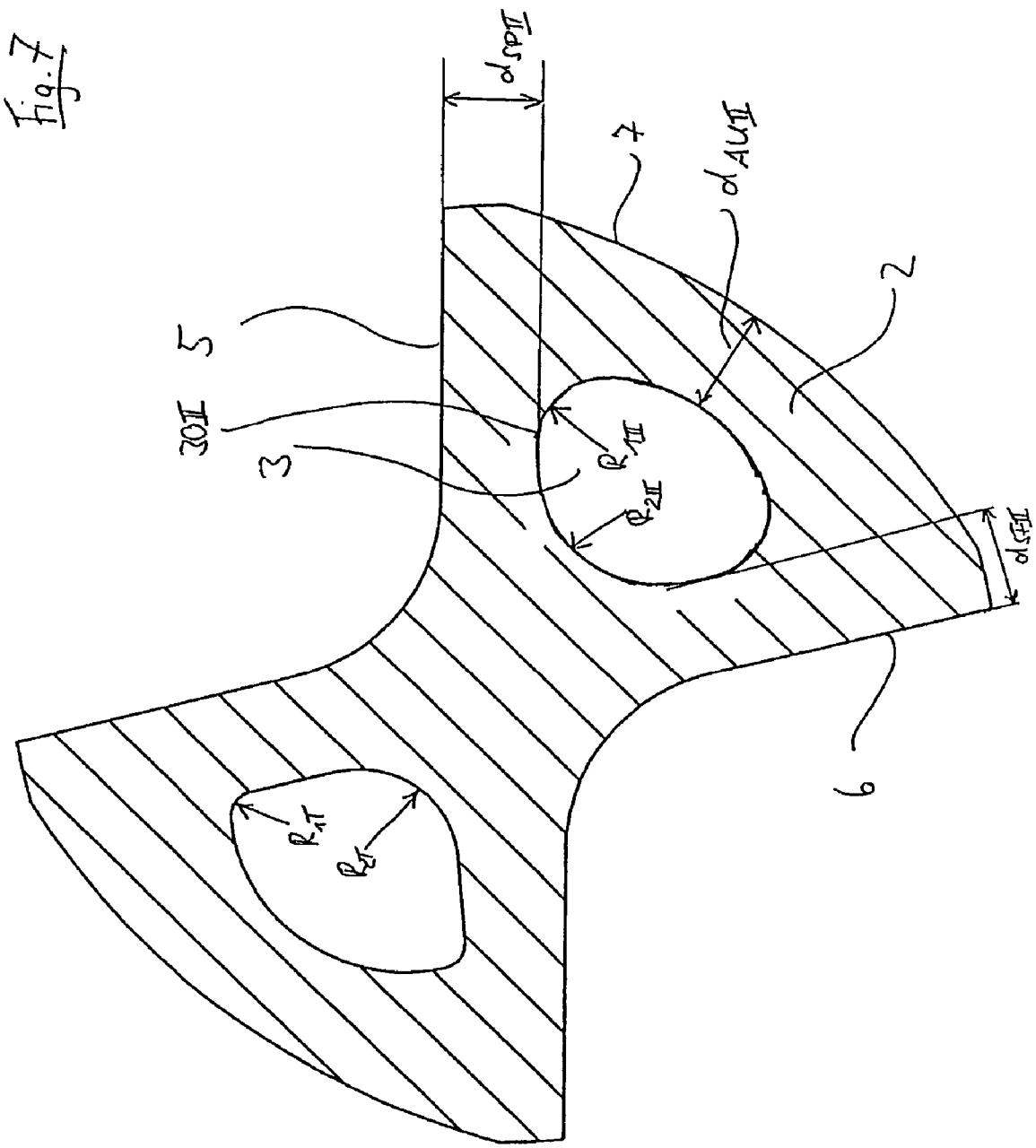
FIG. 7 shows a cross-sectional view of a double cutting drill tool, wherein the upper land shows a conventional trigonal cooling channel contour, while the lower land shows a cooling channel contour according to a further embodiment of the invention.
Figure 8:
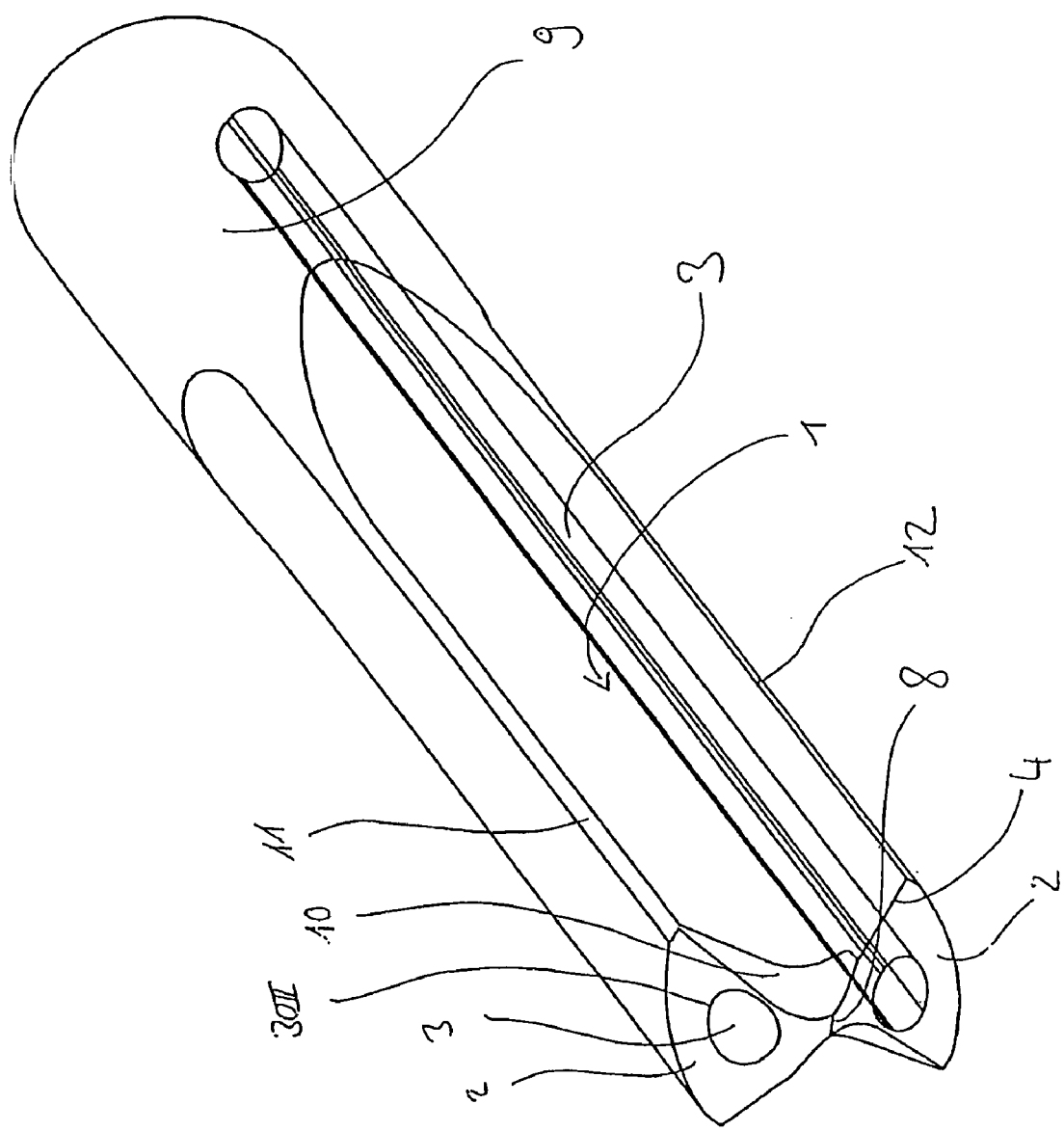
FIG. 8 shows an isometric view of a drill tool with the embodiment of the cooling channel shown in FIG. 7.
Figure 9:
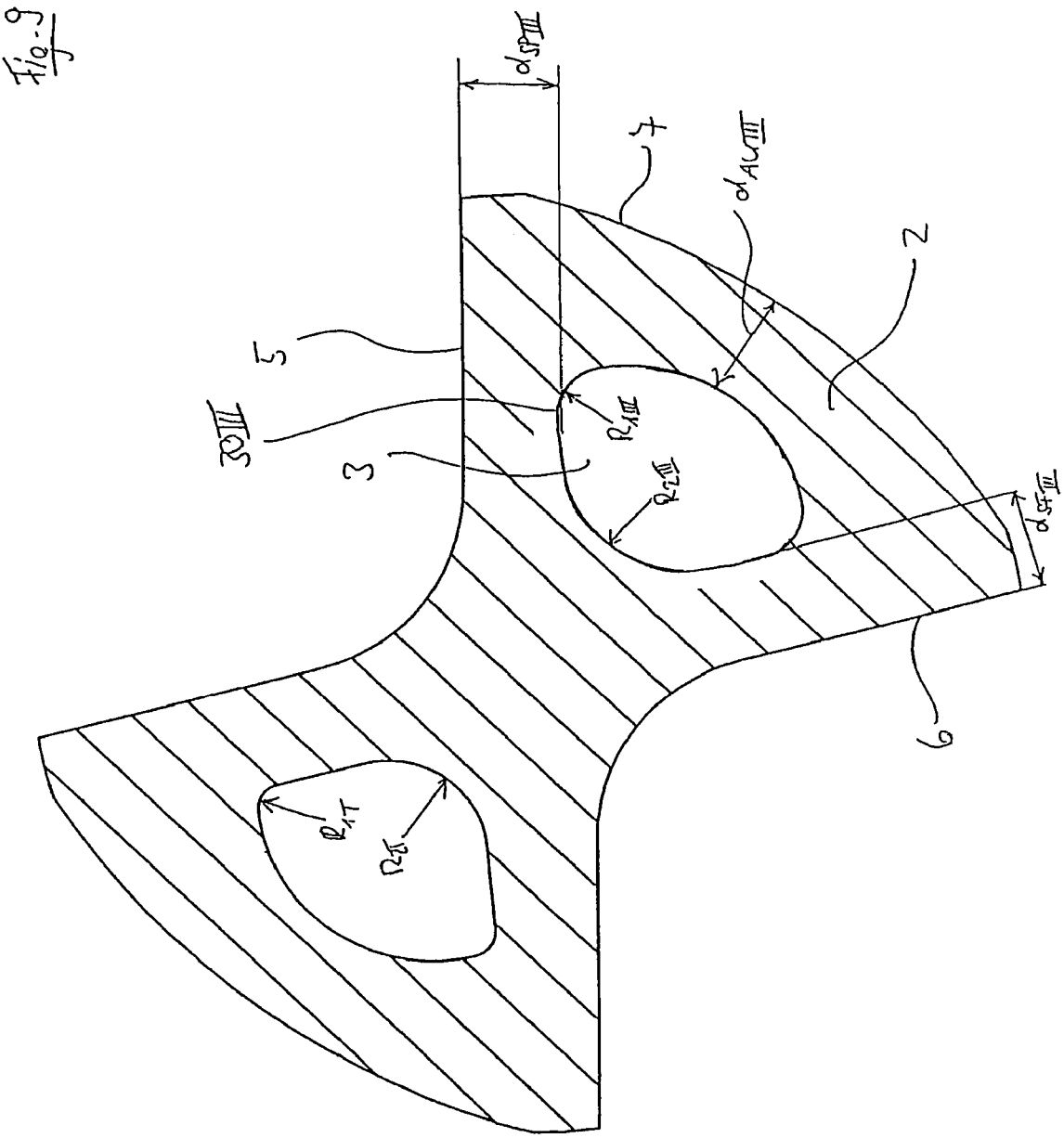
FIG. 9 shows a cross-sectional view of a double cutting drill tool, wherein the upper land shows a conventional trigonal cooling channel contour, while the lower land shows a cooling channel contour according to a further embodiment of the invention.
Figure 10:
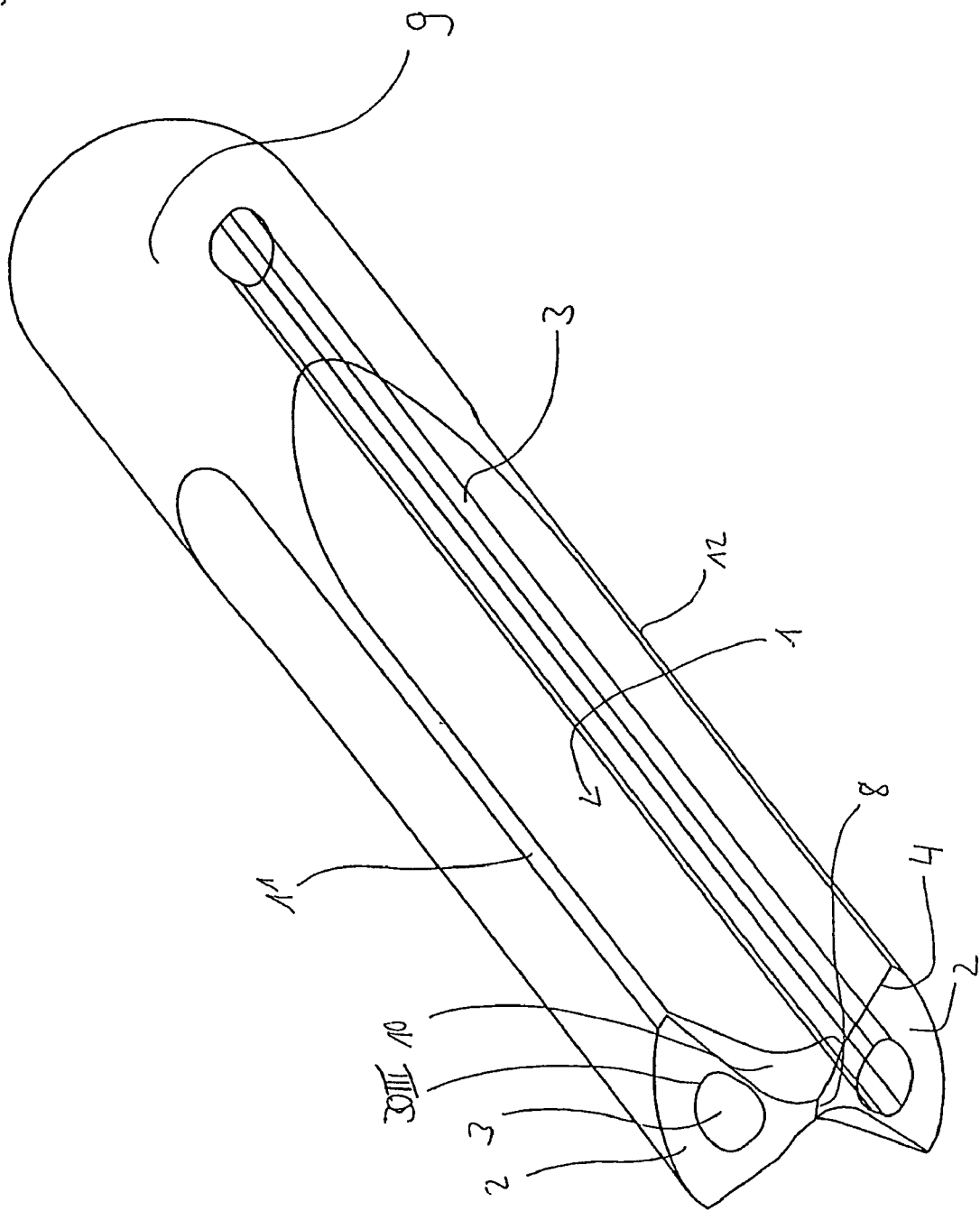
FIG. 10 shows an isometric view of a drill tool with the embodiment of the cooling channel shown in FIG. 9.

The following values were used for the cooling channel profiles:

circular cooling channel profile with R0=0.4, FIG. 1;

elliptical cooling channel profile 30E with main axis 2a=0.55 mm, secondary axis 2b=0.4 mm, FIGS. 2 and 3;

approximately elliptical cooling channel profile 30I with smallest radius of curvature $R_{1I}$=0.3 mm, $R_{2I}$=0.6 mm, FIGS. 4 and 5;

approximately elliptical cooling channel profile 30II with smallest radius of curvature $R_{1II}$=0.3 mm, largest radius of curvature $R_{2II}$=0.5 mm, FIGS. 6 and 7;

approximately elliptical cooling channel profile 30III with smallest radius of curvature $R_{1III}$=0.2 mm, largest radius of curvature $R_{2III}$=0.5 mm, FIGS. 8 and 9; and trigonal cooling channel profile with smallest radius of curvature $R_{1T}$=0.1 mm, largest radius of curvature $R_{2T}$=0.4 mm, FIG. 10 as well as FIGS. 2, 4, 6, 8.

In this arrangement, the cross-sectional area of the circular cooling channel is clearly smaller than that of the other cooling channels, while the cross-sectional areas of the remaining cooling channels are almost identical in size:

| | |
|---|---|
| Circular shape | 0.50 mm² |
| Profile 30E: | 0.69 mm² |
| Profile 30I: | 0.63 mm² |
| Profile 30II: | 0.67 mm² |
| Profile 30III: | 0.66 mm² |
| Trigon: | 0.65 mm² |

During evaluation of the maximum stress peaks on the curvature maximum (spaced apart from the main cutter by 0.25×D) facing the cutting face 5, the particular advantages of the embodiments according to the invention become obvious. With approximately the same or even larger cross-sectional area as is the case in trigon profiles, the cooling channel profiles according to the invention have significantly lower stress values while in comparison with a circular profile, strong gains in area result while at the same time the stress peaks increase underproportionally:

| | |
|---|---|
| Circular shape | 700 N/mm² |
| Profile 30E: | 980 N/mm² |
| Profile 30I: | 1034 N/mm² |
| Profile 30II: | 1031 N/mm² |
| Profile 30III: | 1133 N/mm² |
| Trigon profile: | 1520 N/mm² |

The drawing shows that in the trigon cooling channel with optimum use of a cake-slice shaped design space with a large cross-sectional area the same minimum wall thickness is achieved as is the case in a circular cooling channel profile. However, in this arrangement exorbitant stress peaks (1520 N/mm²) occur, so that the danger of breakage is clearly greater, and/or the design life of the tool is reduced overproportionally.

As far as the stress peaks on the cooling channel are concerned, the stress peak of the cooling channel profile at the groove root is approximately 25%–35% lower than is the case with the trigon shape. The more closely the profile approximates the trigon profile, the more pronounced is the increase in the stress peaks. However, this increase is not linear but exponential so that even with profile 30III it is still possible to obtain good values. However, in the profiles 30E, 30I and 30II, almost identical stress peaks were experienced with approximately identical cross-sectional areas.

In this arrangement, in all cooling channel contours shown, 8%–11% of the nominal diameter of the tool was maintained between the cutting groove and the cutting flank. At 8%×D, in the case of contour 32 (FIG. 1), the wall thickness between the cooling channel and the cutting flank was particularly thin. In contrast to this, at the lower land of the tool shown in FIG. 3, a dashed line shows the external outline of a slightly larger tool. The tool shown in a dashed line is made from an identical blank as is the tool shown in a solid line. Correspondingly, the shape, position and dimensions of the cooling channel 3 are identical. However, the slightly larger tool has a minimum wall thickness $d_{AUE'}$, between the cooling channel 3 and the external circumference 7', which minimum wall thickness $d_{AUE'}$ is more than 20% greater than the minimum wall thickness $d_{AUE}$.

The effect according to the invention was also evident with smaller nominal diameters D. Thus, drills with a nominal diameter D=1.2 mm, whose further dimensions were geometrically similar to those in the above-mentioned drills of D=4 mm, were subjected to a load test. During testing, a torsional moment of 0.026 Nm and a compression force of 52 N were applied to the drills. The drills had the following cooling channel geometries:

circular cooling channel with $R_0$=0.12 mm and area 0.045 mm²;

elliptical cooling channel with a=0.085, b=0.06, area 0.065 mm²;

trigonal cooling channel with $R_1$=0.04 mm, $R_2$=0.16 mm, area 0.07 mm².

In this case again, the maximum stress at the curvature maximum, measured 0.25×D behind the main cutter, at 1480 N/mm2 was exorbitantly higher than in the circular profile where it was 660 N/mm², while in the case of the drill with elliptic cooling channels at a large cross-sectional surface, the tension peaks which were 950 N/mm² were tolerable.

FIG. 12 shows values according to the invention in relation to the lower limit $W_{min}$ of the minimum wall thicknesses across the diameter D. In this arrangement, the minimum wall thicknesses $d_{AUX}$, $d_{SPX}$, $d_{SFX}$ of the tools according to the invention are on, or to the left of, the graphs $W_{min}$, 1, in particular to the left of the graph $W_{in}$, 2, preferably to the left of the graph $W_{min}$, 3, for example to the left of $W_{min}$, 4.

FIG. 13 shows the gradient of the upper limit $W_{max}$, 1 in respect of the minimum wall thicknesses $d_{AUX}$, $d_{SPX}$, $d_{SFX}$ with a nominal diameter D. In FIG. 14, this gradient is compared with the preferred upper limits $W_{max}$, 2, $W_{max}$, 3, $W_{max}$, 4, $W_{max}$, 5 and $W_{max}$, 6.

Of course, deviations from the embodiments shown are possible without leaving the idea on which the invention is based.

In particular, cooling channel contours are imaginable in which the radii at the curvature maximum on the side facing the cutting face of the cooling channels are larger than on the side facing the cutting flank.

Furthermore, the invention is not limited to spiral-shaped or straight-grooved single-cutter or multiple-cutter tools with any desired tip geometry and groove-to-land ratio, in which tools the cutters are directly located on the tool head. Instead, the invention can also be used with tools with screwed-on or soldered-on cutting plates or changeable cutters, as well as with tools where the cutting part or the drill head has been soldered onto the shaft.

The invention was described by means of universal cutting tools. It should be emphasized that deep-hole drilling represents a special field of application, wherein the cooling channel geometry according to the invention is particularly advantageous in the case of relatively small nominal diameters, namely even if the tool is a deep-hole drill tool with an extremely small ratio of nominal diameter to cutting-part length.

The invention claimed is:

1. A rotary driven cutting tool, comprising a drill having a nominal drill diameter D, at least one spiral cutting groove and at least one land which extend from a tool tip of the drill to a tool shaft of the drill, each land comprising a main cutter and an internal cooling channel which extends from the tool tip to an opposite end of the drill and comprises a continuous cross-sectional contour, which tangentially encloses an imaginary circle with a center, the cross-sectional contour of the internal cooling channel comprising at least one curvature maximum whose distance from an axis of the drill in the direction of a line between the center and the axis of the drill exceeds, or is the same as, the distance between the center and the axis of the drill, a minimum wall thickness between the internal cooling channel and an external circumference of the drill being between a lower limit and an upper limit, a minimum wall thickness between the internal cooling channel and a cutting face of the drill being between said lower limit and said upper limit, and a minimum wall thickness between the internal cooling channel and a cutting flank of the drill being between said lower limit and said upper limit, said lower limit being 0.08×D for D<=1 mm, and 0.08 mm for D>1 mm, said upper limit being 0.35×D for D<=6 mm, and 0.4× D−0.30 mm for D>6 mm, a radius at the smallest radius of curvature of the cross-sectional contour of the internal cooling channel corresponding to 0.35 times to 0.9 times a radius of a circle enclosed by the contour.

2. The cutting tool according to claim 1, wherein the nominal diameter D is within the range of from about 1 mm to about 25 mm.

3. The cutting tool according to claim 1, wherein the cutting tool is a two-lip cutter or multiple-lip cutter.

4. The cutting tool according to claim 1, wherein the cross-sectional contour comprises two curvature maxima which have substantially identical radial coordinates.

5. The cutting tool according to claim 1, wherein the cross-sectional contour comprises two curvature maxima having substantially identical radii of curvature.

6. The cutting tool according to claim 1, wherein the cross-sectional area of the cooling channel is symmetrical in relation to a line between the axis of the drill and the center.

7. The cutting tool according to claim 1, wherein the cross-sectional contour of the internal cooling channel is elliptical in shape on a side situated towards the cutting face when viewed from a line between the axis of the drill and the center, and/or on a side situated towards the cutting flank, wherein the length ratio between the main axis of the ellipse and the secondary axis of the ellipse is within the range of from about 1.18 to about 1.65.

8. The cutting tool according to claim 4, wherein the cross-sectional contour of the internal cooling channel comprises curvature maxima whose distance from the axis of the drill in a direction of a line between the axis of the drill and the center exceeds the distance from the center.

9. The cutting tool according to claim 8, wherein the cross-sectional contour of the internal cooling channel on the side facing the cutting face and/or on the side facing the cutting flank radially within the curvature maxima comprises a straight section.

10. The cutting tool according to claim 9, wherein the straight sections extend parallel to the cutting face or to the cutting flank.

11. The cutting tool according to claim 1, wherein said cutting tool comprises a deep-hole drill with a ratio of nominal diameter D to cutting part length in the range of from about 1:5 to about 1:200.

* * * * *